(12) United States Patent
Clements

(10) Patent No.: US 6,702,349 B2
(45) Date of Patent: Mar. 9, 2004

(54) APPARATUS FOR COLLECTING ANIMAL WASTE

(76) Inventor: Grace Clements, 115 Griffin Ave., Bridgeport, CT (US) 06606

( * ) Notice: Subject to any disclaimer, the term of this patent is extended or adjusted under 35 U.S.C. 154(b) by 0 days.

(21) Appl. No.: 10/007,546

(22) Filed: Nov. 6, 2001

(65) Prior Publication Data

US 2002/0053807 A1 May 9, 2002

Related U.S. Application Data

(60) Provisional application No. 60/246,055, filed on Nov. 6, 2000.

(51) Int. Cl.[7] .............................................. A01K 29/00
(52) U.S. Cl. ...................................................... 294/1.5
(58) Field of Search ........................... 294/1.3–1.5, 1.1, 294/5.5; 15/104.8, 257.1, 257.2, 257.3, 257.4, 257.7; 119/161, 867; 248/99–101

(56) References Cited

U.S. PATENT DOCUMENTS

| 3,744,453 A | | 7/1973 | Deitch | |
|---|---|---|---|---|
| 3,872,831 A | | 3/1975 | Cassidy | |
| 4,012,067 A | * | 3/1977 | Travis | 294/1.4 |
| 4,146,260 A | * | 3/1979 | Carrington | 294/1.5 |
| 4,335,678 A | * | 6/1982 | Garza et al. | 294/1.5 |
| 4,705,310 A | * | 11/1987 | Scripter | 294/1.4 |
| 5,269,575 A | * | 12/1993 | Parvaresh | 294/1.5 |
| 5,683,129 A | | 11/1997 | Jensen | |
| 5,971,452 A | * | 10/1999 | Marymor et al. | 294/1.5 |
| 6,149,214 A | * | 11/2000 | Kipka et al. | 294/1.5 |

FOREIGN PATENT DOCUMENTS

| CA | 2055507 | * | 5/1993 | 294/1.3 |
|---|---|---|---|---|
| DE | 2804553 | * | 8/1979 | 294/1.5 |
| NL | 7902410 | * | 9/1980 | 294/1.5 |

* cited by examiner

Primary Examiner—Johnny D. Cherry
(74) Attorney, Agent, or Firm—Matthew J. Peirce

(57) ABSTRACT

A new and improved apparatus is disclosed that is specifically designed for the purpose of providing dog owners or caretakers with a sanitary method of collecting and disposing of dog defecate. The apparatus would comprise a handle with an end-mounted scoop. A plastic bag is placed on the end-mounted scoop and placed below the dog to collect defecate before it hits the ground, thus making clean-up easier. The plastic bag would then be removed after use of the present invention and attached to the chain which has an end-mounted clip to be tied or tossed for easy disposal. The present invention also would serve as a training tool for the dog.

3 Claims, 1 Drawing Sheet

US 6,702,349 B2

APPARATUS FOR COLLECTING ANIMAL WASTE

This application claims the benefit of U.S. application No. 60/246,055, filed Nov. 6, 2000.

I. BACKGROUND OF THE INVENTION

The present invention concerns that of a new and improved apparatus for cleaning up after a pet, and more particularly, a dog.

II. DESCRIPTION OF THE PRIOR ART

U.S. Pat. No. 5,683,129, issued to Jensen, discloses a pooch potty which comprises an elongated handle with a bag holder and includes a structure for attaching the bag holder to a lower end of the elongated handle.

U.S. Pat. No. 3,872,831, issued to Cassidy, discloses a portable sanitation device for collecting fecal matter, particularly from dogs.

U.S. Pat. No. 3,744,453, issued to Deitch, discloses a sanitary waste receiver and guide rod for use with dogs, whereby their waste products or droppings may be received and disposed of in a sanitary manner.

III. SUMMARY OF THE INVENTION

The present invention concerns that of a new and improved apparatus specifically designed for the purpose of providing dog owners or caretakers with a sanitary method of collecting and disposing of dog defecate. The apparatus would comprise a handle with an end-mounted scoop. A plastic bag is placed on the end-mounted scoop and placed below the dog to collect defecate before it hits the ground, thus making clean-up easier. The plastic bag would then be removed after use of the present invention and attached to the chain which has an end-mounted clip to be tied or tossed for easy disposal. The present invention also would serve as a training tool for the dog.

There has thus been outlined, rather broadly, the more important features of a sanitary apparatus for use with pets in order that the detailed description thereof that follows may be better understood and in order that the present contribution to the art may be better appreciated. There are, of course, additional features of the sanitary apparatus for use with pets that will be described hereinafter and which will form the subject matter of the claims appended hereto.

In this respect, before explaining at least one embodiment of the sanitary apparatus for use with pets in detail, it is to be understood that the sanitary apparatus for use with pets is not limited in its application to the details of construction and to the arrangements of the components set forth in the following description or illustrated in the drawings. The sanitary apparatus for use with pets is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present sanitary apparatus for use with pets. It is important, therefore, that the claims be regarded as including such equivalent constructions insofar as they do not depart from the spirit and scope of the present invention.

It is therefore an object of the present invention to provide a sanitary apparatus for use with pets which has all of the advantages of the prior art and none of the disadvantages.

It is another object of the present invention to provide a sanitary apparatus for use with pets which may be easily and efficiently manufactured and marketed.

It is another object of the present invention to provide a sanitary apparatus for use with pets which is of durable and reliable construction.

It is yet another object of the present invention to provide a sanitary apparatus for use with pets which is economically affordable and available to the buying public.

It is yet another object of the present invention to provide a sanitary apparatus for use with pets which provides additional benefits not present in the prior art.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
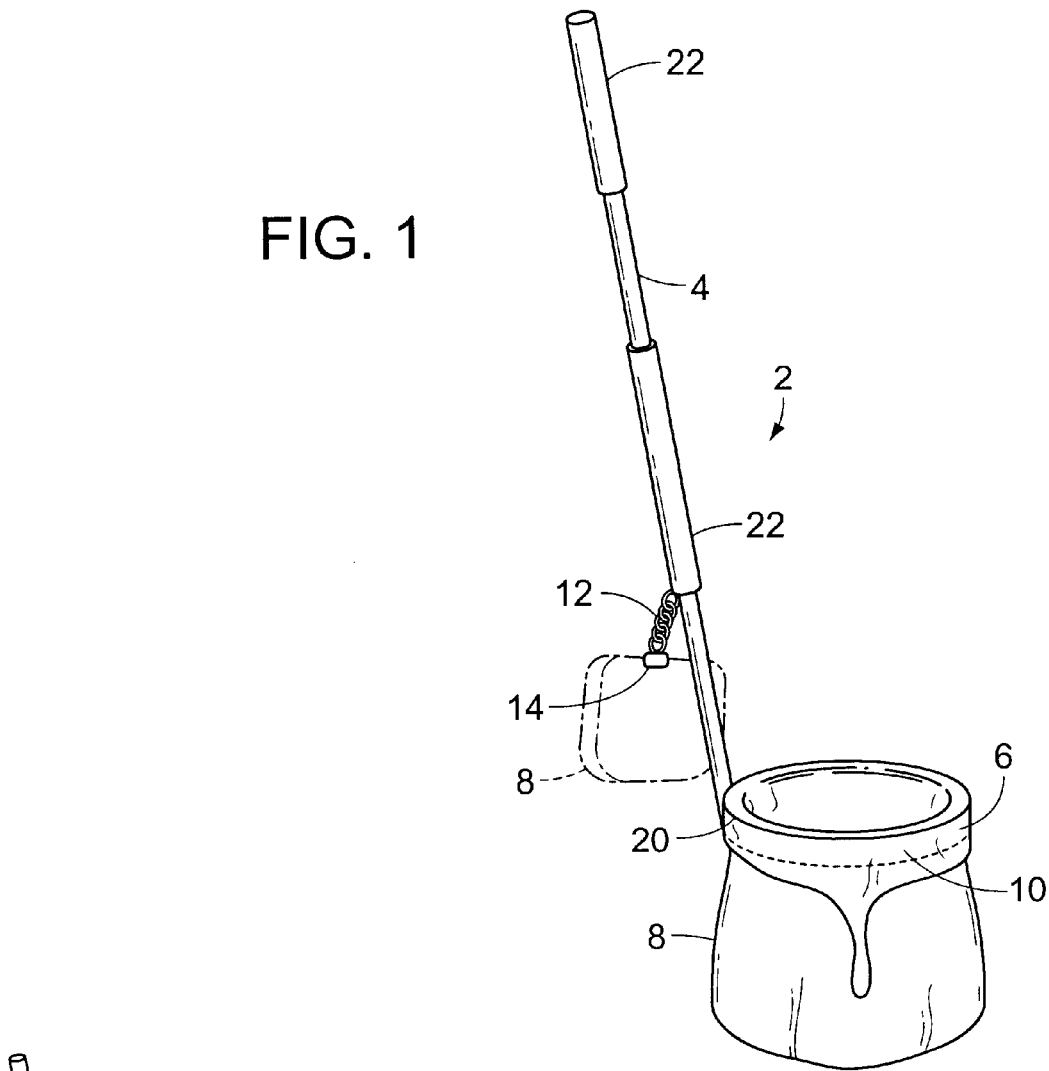
FIG. 1 shows a perspective view of the present invention.

FIG. 1 shows a perspective view of the present invention. The present invention concerns that of a new and improved apparatus 2 for cleaning up after a pet, and more particularly, a dog. The apparatus 2 would comprise a handle 4 with an end-mounted scoop 6, with a plastic bag 8 placed on the end-mounted scoop 6 and placed below the dog to collect defecate before it hits the ground, thus making clean-up easier. Scoop 6 would be attached to the handle 4 by a metal bracket 20.

Handle 4 would be formed from a dowel rod that would measure approximately three feet in length and approximately one-half inch in diameter. Handle 4 would also have at least one foam rubber grip 22 attached along its length for ease of use while gripping and using the apparatus 2.

The scoop 6 would preferably measure approximately nine inches in diameter, and furthermore, the rim 10 of the scoop 6 would preferably have a diameter of one and one-half inches. The rim 10 would preferably be circular to allow easy placement and removal of plastic bag 8.

Handle 4 would also have an attached chain 12, which would have an end-mounted clip 14. Clip 14 would be used to carry around plastic bags 8 after it has been used with the present invention. If plastic bag 8 has already been used, clip 14 can be used to hold the used bag 8 closed until a user can properly dispose of it in a trash receptacle.

Figure 2:
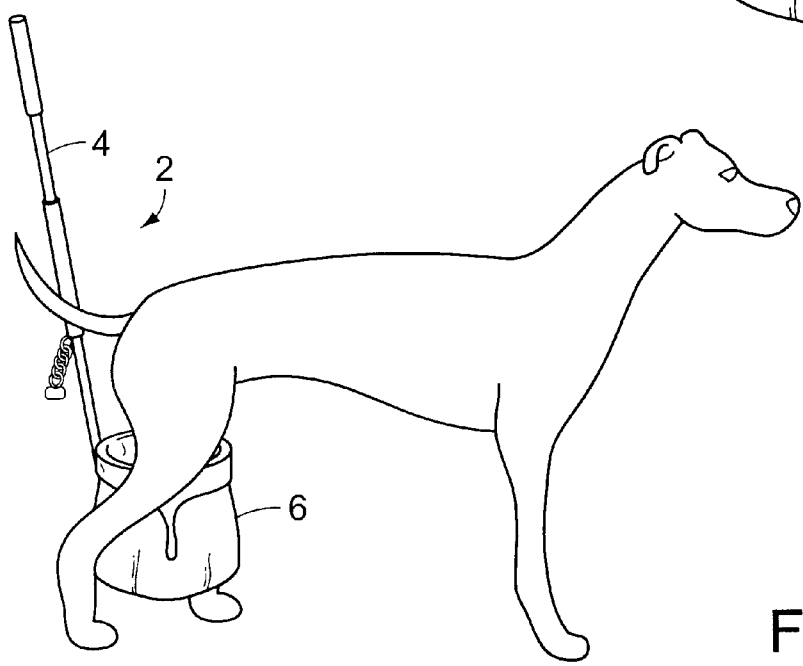
FIG. 2 shows the present invention as it would appear in use.

FIG. 2 shows the present invention as it would appear in use. As can be seen, a user would place scoop 6 underneath a dog before it would defecate, keeping the dog's waste off of the ground. The plastic bag 8 would then be removed after use of the present invention and attached to the chain which has an end-mounted clip to be tied or tossed for easy disposal. The present invention also would serve as a training tool for the dog.

What I claim as my invention is:

1. An apparatus for collecting animal waste comprising:
   (a) a handle portion having two ends, a first end and a second end, the handle portion being formed from a dowel rod, the handle portion being about three feet in length and about one-half inch in width, (b) a circular rim attached to the second end of the handle portion, the circular rim forming a loop nine inches in diameter, the circular rim being one and one-half inches in diameter, (c) a bracket for attaching the handle portion to the circular rim, (d) at least one foam rubber grip attached to the handle portion, (e) a plastic bag having a continuous open end, the continuous open end being removably attached to the circular rim, (f) means for storing a plastic bag after animal waste is deposited within the plastic bag, wherein the means further comprises a chain having two ends, a first end and a second end, the first end of the chain attached to the handle portion, the means further comprising a clip attached to the second end of the chain, wherein a user would take a plastic bag after animal waste is deposited within the plastic bag and attach the plastic bag to the clip until it could be properly disposed of at a later time, (g) wherein a user would place the circular rim under an animal when necessary to catch excreted waste, and further wherein the user would remove the plastic bag from the circular rim after animal waste is deposited within the plastic bag.

2. An apparatus for collecting animal waste according to claim 1 wherein the circular rim is fabricated from plastic.

3. An apparatus for collecting animal waste according to claim 1 wherein the circular rim is fabricated from metal.

* * * * *